United States Patent
Pilkington et al.

(10) Patent No.: US 7,477,508 B1
(45) Date of Patent: Jan. 13, 2009

(54) COMBINATION KEYBOARD AND DIGITAL TABLET

(75) Inventors: Adam J. Pilkington, Southampton (GB); Simon C. E. Rowland, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/111,602

(22) Filed: Apr. 29, 2008

(51) Int. Cl.
*G06F 1/16* (2006.01)

(52) U.S. Cl. .................. 361/680; 361/683; 248/917

(58) Field of Classification Search ......... 361/679–683; 312/223.1, 223.2; 248/917–923; 345/168, 345/173
See application file for complete search history.

(56) References Cited

U.S. PATENT DOCUMENTS

| | | | |
|---|---|---|---|
| 4,899,137 A | 2/1990 | Behrens et al. | |
| 5,241,303 A * | 8/1993 | Register et al. | 345/168 |
| 5,440,502 A * | 8/1995 | Register | 361/681 |
| 5,548,478 A * | 8/1996 | Kumar et al. | 361/681 |
| 5,949,408 A | 9/1999 | Kang et al. | |
| 6,122,152 A * | 9/2000 | Goto et al. | 361/1 |
| 6,243,258 B1 * | 6/2001 | Paratore | 361/680 |
| 6,262,885 B1 * | 7/2001 | Emma et al. | 361/683 |
| 6,507,483 B2 * | 1/2003 | Oura et al. | 361/680 |
| 6,700,773 B1 * | 3/2004 | Adriaansen et al. | 361/680 |
| 6,903,927 B2 * | 6/2005 | Anlauff | 361/681 |
| 6,944,012 B2 | 9/2005 | Doczy et al. | |
| 7,030,859 B2 * | 4/2006 | Lin et al. | 345/168 |
| 2001/0030850 A1 * | 10/2001 | Ditzik | 361/683 |
| 2003/0222799 A1 * | 12/2003 | Uke | 341/22 |
| 2005/0122671 A1 | 6/2005 | Homer | |
| 2005/0200608 A1 * | 9/2005 | Ulla et al. | 345/168 |
| 2006/0238968 A1 * | 10/2006 | Maatta et al. | 361/683 |

\* cited by examiner

*Primary Examiner*—Jayprakash N Gandhi
*Assistant Examiner*—Anthony Q Edwards
(74) *Attorney, Agent, or Firm*—Robert E. Straight; Dillon & Yudell LLP

(57) ABSTRACT

A combination keyboard and digital tablet includes a top side and a bottom side. The top side of the keyboard body houses a plurality of keys. The bottom side of the keyboard body includes a recess. A digital tablet body is hingedly joined to the keyboard body. The digital tablet body includes a top side and a bottom side. The top side of the digital tablet body includes a pressure sensitive digital tablet recessed in the digital tablet body. The digital tablet body is movable between a first position and a second position. In the first position, the bottom side of the digital tablet body is positioned in the recess of the keyboard body. In the second position, the top side of the digital tablet body and the top side of the keyboard body face in a similar direction. The combination may include a position switch operable to disable the keys when the top side of the keyboard body is facing in a downward direction. Legs may be movably received in the top side of the keyboard body and configured to space the keys apart from a surface the said top side of the keyboard body is facing in the downward direction.

1 Claim, 3 Drawing Sheets

COMBINATION KEYBOARD AND DIGITAL TABLET

BACKGROUND OF THE INVENTION

1. Technical Field

The present invention relates in general to the field of computer user input devices and more particularly to a combination keyboard and digital tablet.

2. Description of the Related Art

The traditional mouse is recognized as being a general purpose tool that can be used in a variety of situations. However, if fine grained control is required, such as drawing, then a digital tablet is often used in conjunction with a stylus. A digital tablet gives the user a valuable tool, but it takes up physical desk space. As offices and work spaces become smaller, space becomes more becomes more valuable. Also, most users need a digital tablet only occasionally. Accordingly, most users who have a digital tablet keep it stored most of the time. When the user wishes to use the digital tablet, he or she must take it out of its storage area, clear space on the desk for it, and hook it up to his or her computer.

SUMMARY OF THE INVENTION

The present invention provides a combination keyboard and digital tablet. The combination includes a keyboard body, which includes a top side and a bottom side. The top side of the keyboard body houses a plurality of keys. The bottom side of the keyboard body includes a recess. A digital tablet body is hingedly joined to the keyboard body. The digital tablet body includes a top side and a bottom side. The top side of the digital tablet body includes a pressure sensitive digital tablet recessed in the digital tablet body. The digital tablet body is movable between a first position and a second position. In the first position, the bottom side of the digital tablet body is positioned in the recess of the keyboard body. In the second position, the top side of the digital tablet body and the top side of the keyboard body face in a similar direction. The combination may include a position switch operable to disable the keys when the top side of the keyboard body is facing in a downward direction. Legs may be movably received in the top side of the keyboard body and configured to space the keys apart from a surface the said top side of the keyboard body is facing in the downward direction.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
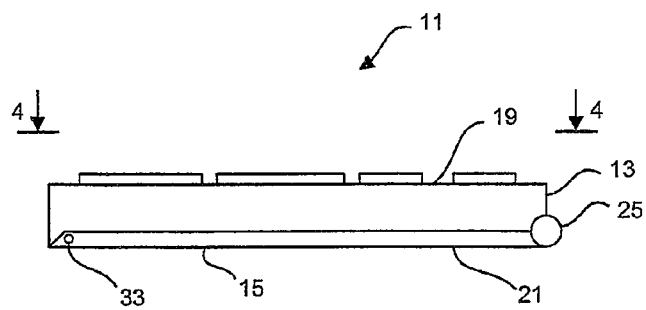
FIG. 1 is a side view of an embodiment of a combination keyboard and digital tablet according to the present invention with the digital tablet part folded under the keyboard part.
Figure 4:
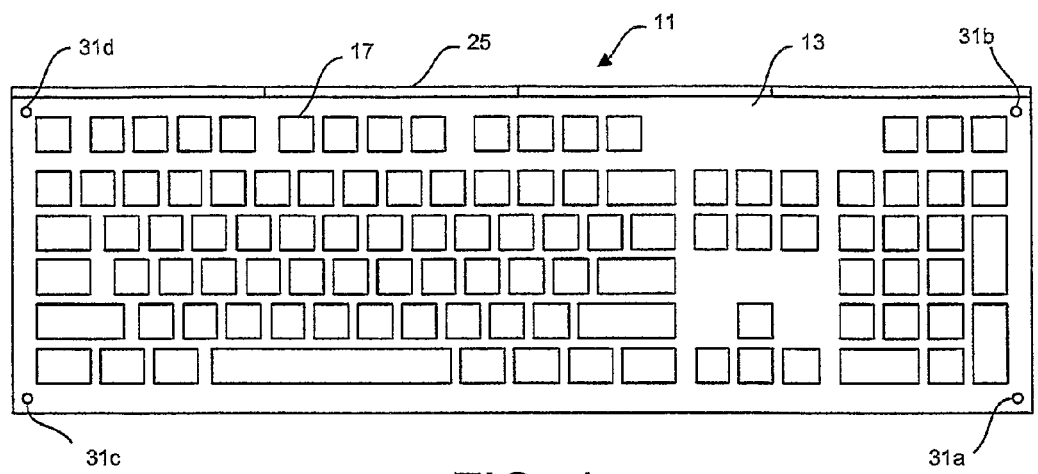
FIG. 4 is a top view taken along line 4-4 of FIG. 1.

Referring now to the drawings, and first to FIG. 1, an embodiment of the combination keyboard and digital tablet is designated generally by the numeral 11. Combination 11 includes a keyboard part 13 and a digital tablet part 15. As best shown in FIG. 4, keyboard part includes a plurality of keys, including a key 17, carried in its top side 19, as well as the internal mechanisms and electronics (not shown) of a standard computer keyboard.

Figure 5:
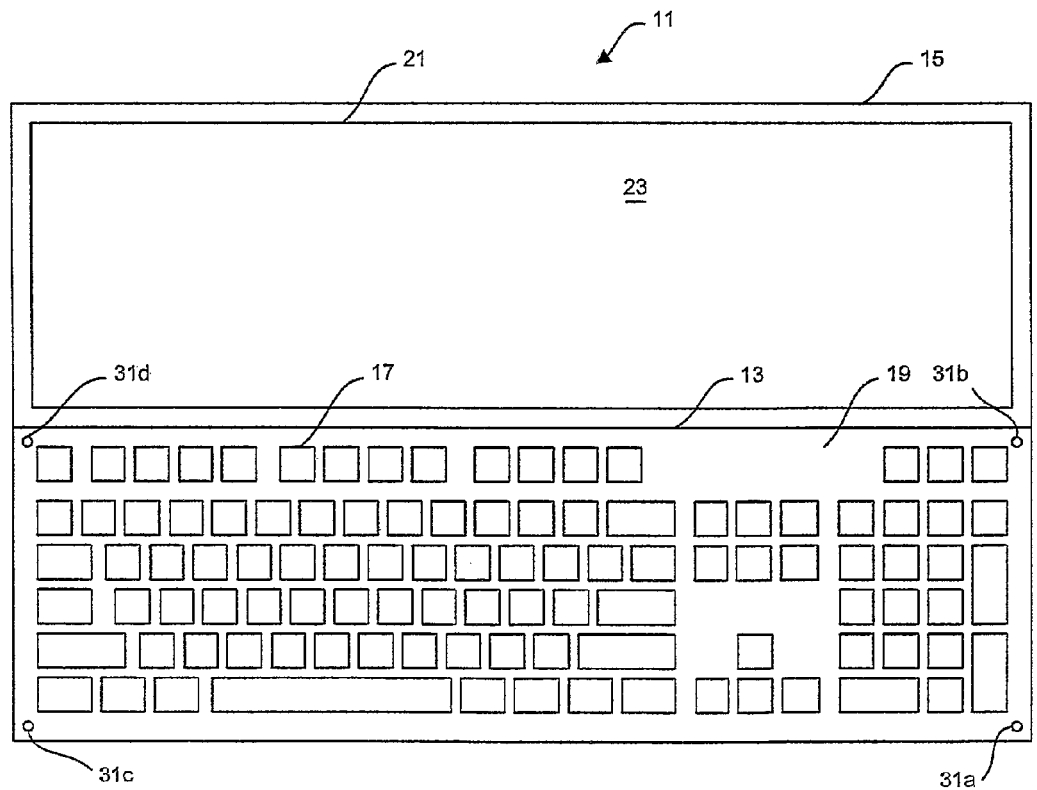
FIG. 5 is a top view taken along line 5-5 of FIG. 2.

As best shown in FIG. 5, digital tablet part 17 includes a top side 21, which includes a pressure sensitive digital tablet screen 23. Preferably, screen 23 is recessed into top side 21 to protect screen 23 when top side 21 is resting on a horizontal surface. Digital tablet part 15 includes the internal electronics (not shown) of a standard computer digital tablet.

Figure 2:
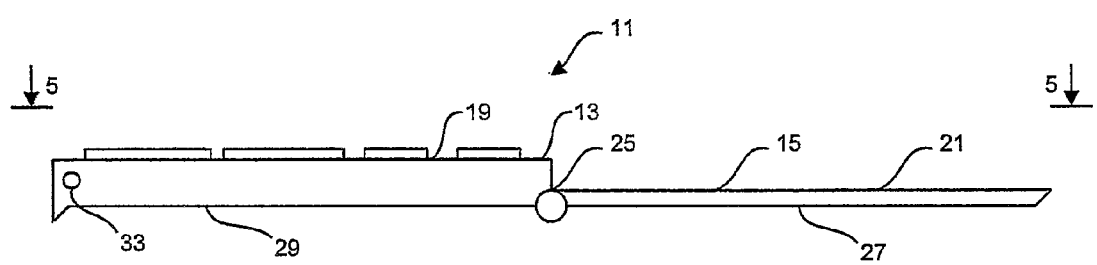
FIG. 2 is a side view of the embodiment of FIG. 1 with the digital tablet part unfolded.
Figure 3:
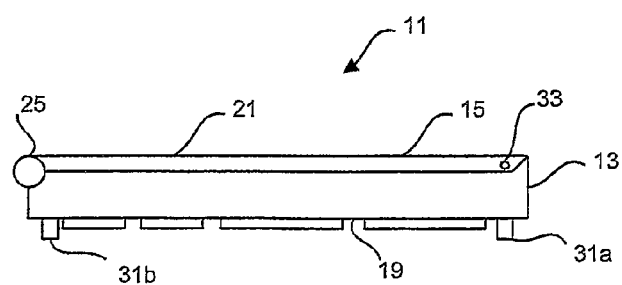
FIG. 3 is a side view of the embodiment of FIG. 1 in the inverted position.

Keyboard part 13 and digital tablet part 15 are connected together by a hinge 25. Hinge 25 enables combination 11 to be moved between a closed position, as shown in FIGS. 1, 3 and 4, and an open position, as shown in FIGS. 2 and 4. In the closed position, the bottom side 27 of digital tablet part 15 rests in a recess 29 in the bottom side 31 of keyboard part 13. In the open position, digital tablet part 15 extends from keyboard part 13, as shown in FIGS. 2 and 5. In the open position, top side 19 of keyboard part 13 and top side 21 of digital tablet part 15 face in the same direction. Thus, in the open position, both the keys of keyboard part 13 and pressure sensitive screen 23 of digital tablet part 15 may be used. In the closed position, top side 19 of keyboard part 13 and top side 21 of digital tablet part 15 face in opposite directions. Thus, combination 11 may be used as a keyboard when oriented as shown in FIG. 1, or as a digital tablet when oriented as shown in FIG. 3.

Although hinge 25 is illustrated as being located such that keyboard part 13 is positioned between a user and digital tablet part 15 in the open position, those skilled in the art will recognize that hinge 25 may be located such that digital tablet part 15 is positioned between a user and keyboard part 13 in the open position. Additionally, the hinge may be located such that digital tablet part 15 may be swung out to one side or the other of keyboard part 15 in the open position. A further alternative embodiment may include a double hinge arrangement wherein digital tablet part 15 may be swung in either of two directions.

Combination 11 may include extendible legs 31 carried in top side 19 of keyboard part 13. Legs may be moved back and forth between a retracted position as shown in FIGS. 1, 2, 3, and 5, and an extended position, as shown in FIG. 3. In the extended position, legs 31 elevate the keys of keyboard part 13 above a surface upon which combination 11 rests in the orientation of FIG. 3. Combination 11 may also include a stylus 33 that may be stored in a recess in digital tablet part 13. The recess may be a tube positioned in the side of digital tablet part 15, as in FIGS. 1 and 3. Alternatively, the recess may be a slot positioned in the side or top side of digital tablet part 15.

Figure 6:
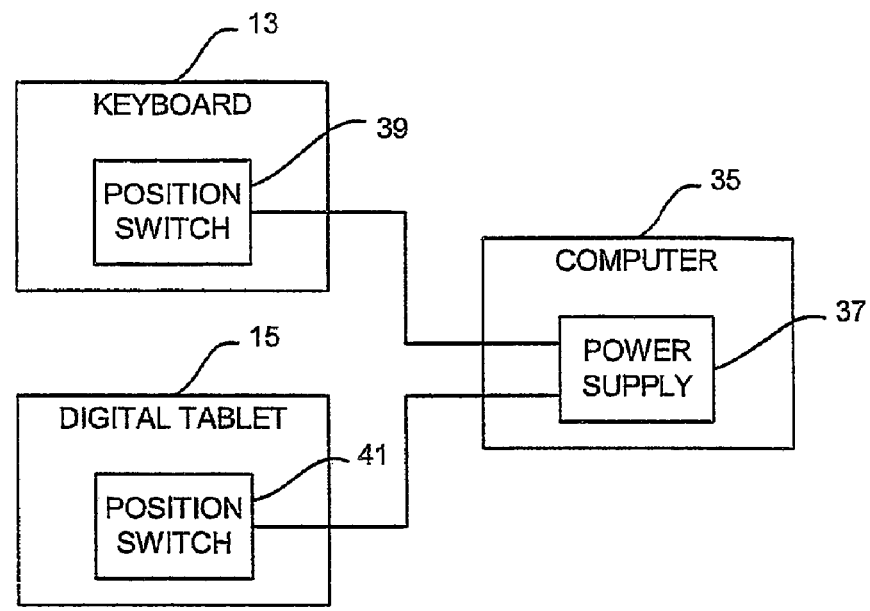
FIG. 6 is a block diagram of an embodiment of a position or orientation control system according to the present invention; and, FIG. 7 is a block diagram of an alternative embodiment of a position or orientation control system according to the present invention.

Combination 11 may include position switches for disabling keyboard part 13 or digital tablet part 15 when their respective top sides 19 and 21 are facing in a downward direction. Referring to FIG. 6 there is illustrated a block diagram of an embodiment of a position control system according to the present invention. Keyboard 13 and digital tablet 15 are connected to a computer 35, as well known to those skilled in the art. The connections between keyboard 13, digital tablet 15, and computer 35 pass signals back and forth and provide power to keyboard 13 and digital tablet 15. Computer 35 includes a power supply 37 that is coupled to a position switch 39 in keyboard 13 and a position switch 41 in digital tablet 15. Position switches 39 and 41 may be mercury switches or the like.

Position switch 39 is mounted in keyboard 13 such that when top side 19 facing upwardly, position switch 39 is closed, and when top side 19 is facing downwardly, position switch 39 is open. Similarly, position switch 41 is mounted in digital tablet 15 such that when top side 21 is facing upwardly, position switch 41 is closed, and when top side 21 is facing downwardly, position switch 41 is open. Thus, when combination 11 is in the position of FIG. 1, keyboard part 13 is enabled and digital tablet part 15 is disabled. When combination 11 is in the position of FIG. 2, both keyboard part 13 and digital tablet part 15 are enabled. When combination 11 is in the position of FIG. 3, keyboard part 13 is disabled and digital tablet part 15 is enabled.

Figure 7:
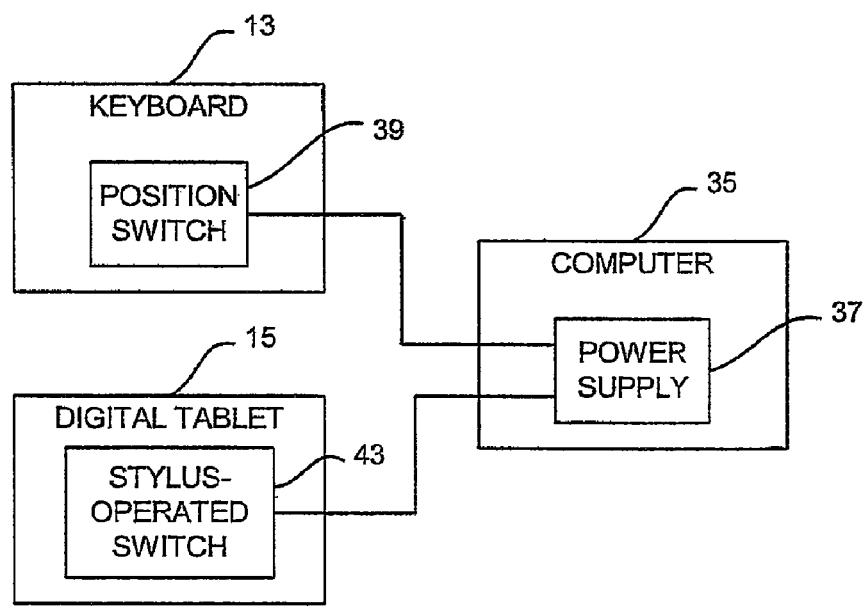

In an alternative embodiment, combination 11 may include a position switch for disabling keyboard part 13 when its top side 19 is facing in a downward direction and a mechanical stylus-operated switch for enabling digital tablet part 15 for use. Referring to FIG. 7 there is illustrated a block diagram of an embodiment of a control system according to the present invention. Keyboard 13 and digital tablet 15 are connected to a computer 35, as well known to those skilled in the art. The connections between keyboard 13, digital tablet 15, and computer 35 pass signals back and forth and provide power to keyboard 13 and digital tablet 15. Computer 35 includes a power supply 37 that is coupled to a position switch 39 in keyboard 13 and a stylus-operated switch 43 in digital tablet 15. Position switch 39 may be a mercury switch or the like.

Stylus-operated switch 43 may be a mechanical switch that is operated when stylus 33 is inserted into or removed from its storage recess. When stylus 33 is in its recess, switch 43 is in the off position. When stylus 33 is out of its recess, switch 43 is in the on position. Thus, a user may enable digital tablet part 15 simply by removing stylus 43 from its recess.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A combination keyboard and digital tablet, which comprises:
   a keyboard body, said keyboard body including top side and a bottom side, said top side of said keyboard body housing a plurality of keys, said bottom side of said keyboard body including a recess;
   a digital tablet body hingedly joined to said keyboard body, said digital tablet body including a top side and a bottom side, said top side of said digital tablet body including pressure sensitive digital tablet recessed in said digital tablet body, said digital tablet body being movable between a first position, wherein said bottom side of said digital tablet body is positioned in said recess of said keyboard body, and a second position, wherein topside of said digital tablet body and said topside of said keyboard body face in a similar direction;
   a first position switch operable to disable said keys when said top side of said keyboard body is facing in a downward direction;
   a second position switch operable to disable said pressure sensitive digital tablet when said top side of said digital tablet body is facing in said downward direction; and,
   legs movably received in said top side of said keyboard body and configured to space said keys apart from a surface when said top side of said keyboard body is facing in said downward direction.

* * * * *